United States Patent
Zukerman et al.

(10) Patent No.: US 8,781,047 B2
(45) Date of Patent: Jul. 15, 2014

(54) DEVICE, SYSTEM AND METHOD OF CLOCK DISTRIBUTION

(75) Inventors: Gil Zukerman, Hod-HaSharon (IL); Yaron Alpert, Hod Hasharon (IL); Leora Roth, Raanana (IL)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 13/535,464

(22) Filed: Jun. 28, 2012

(65) Prior Publication Data

US 2014/0003542 A1    Jan. 2, 2014

(51) Int. Cl.
*H04L 7/00*        (2006.01)

(52) U.S. Cl.
USPC .......................................................... 375/354

(58) Field of Classification Search
USPC .................. 375/354, 355; 327/144, 347, 503; 370/144, 145, 296
See application file for complete search history.

(56) References Cited

U.S. PATENT DOCUMENTS

| | | | |
|---|---|---|---|
| 2010/0001770 A1* | 1/2010 | Bogenberger et al. | 327/144 |
| 2012/0063296 A1* | 3/2012 | Wang et al. | 370/216 |
| 2012/0069944 A1* | 3/2012 | Hadzic et al. | 375/376 |

OTHER PUBLICATIONS

IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; Jun. 12, 2007.

Wireless-Gigabit-Alliance (WGA) specifications (Wireless Gigabit Alliance, Inc. WiGig MAC and PHY Specification Version 1.0, Final specification), Apr. 2010.

OMA Secure User Plane Location Archive, Candidate Version 2.0—May 27, 2011; Open Mobile Alliance OMA-AD-SUPL-V2_0-20110527-C; 54 pages.

Andrei Popescu, Google, Inc. Geolocation API Specfication, W3C Candidate Recommendation Sep. 7, 2010. W3C Geolocation Working Group; 14 pages.

* cited by examiner

*Primary Examiner* — Khai Tran
(74) *Attorney, Agent, or Firm* — Shichur & Co.

(57) ABSTRACT

Some demonstrative embodiments include devices, systems and/or methods of clock distribution. For example, a device may include a plurality of wireless communication units including at least a first wireless communication unit, which includes a first clock source to generate a first clock signal, and a second wireless communication unit, which includes a second clock source to generate a second clock signal, wherein the plurality of wireless communication units are to switch between commonly using the first clock signal as a common master clock signal and commonly using the second clock signal as the common master clock signal.

19 Claims, 6 Drawing Sheets

US 8,781,047 B2

DEVICE, SYSTEM AND METHOD OF CLOCK DISTRIBUTION

BACKGROUND

A device may include several collocated wireless communication units. For example, the device may include a cellular communication unit, a Wireless Fidelity (WiFi) communication unit, a Global Navigation Satellite System (GNSS) communication unit, and the like.

Some of the wireless communication units may require an accurate clock to perform one or more functionalities. For example, the GNSS communication unit may require an accurate clock for acquiring one or more GNSS satellites, in order to enable an estimation of a location of the device.

The device may include a single clock source configured to provide the accurate clock to all of the wireless communication units. The single clock source may distribute the accurate clock by providing a uni-directional signal to the wireless communication units.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
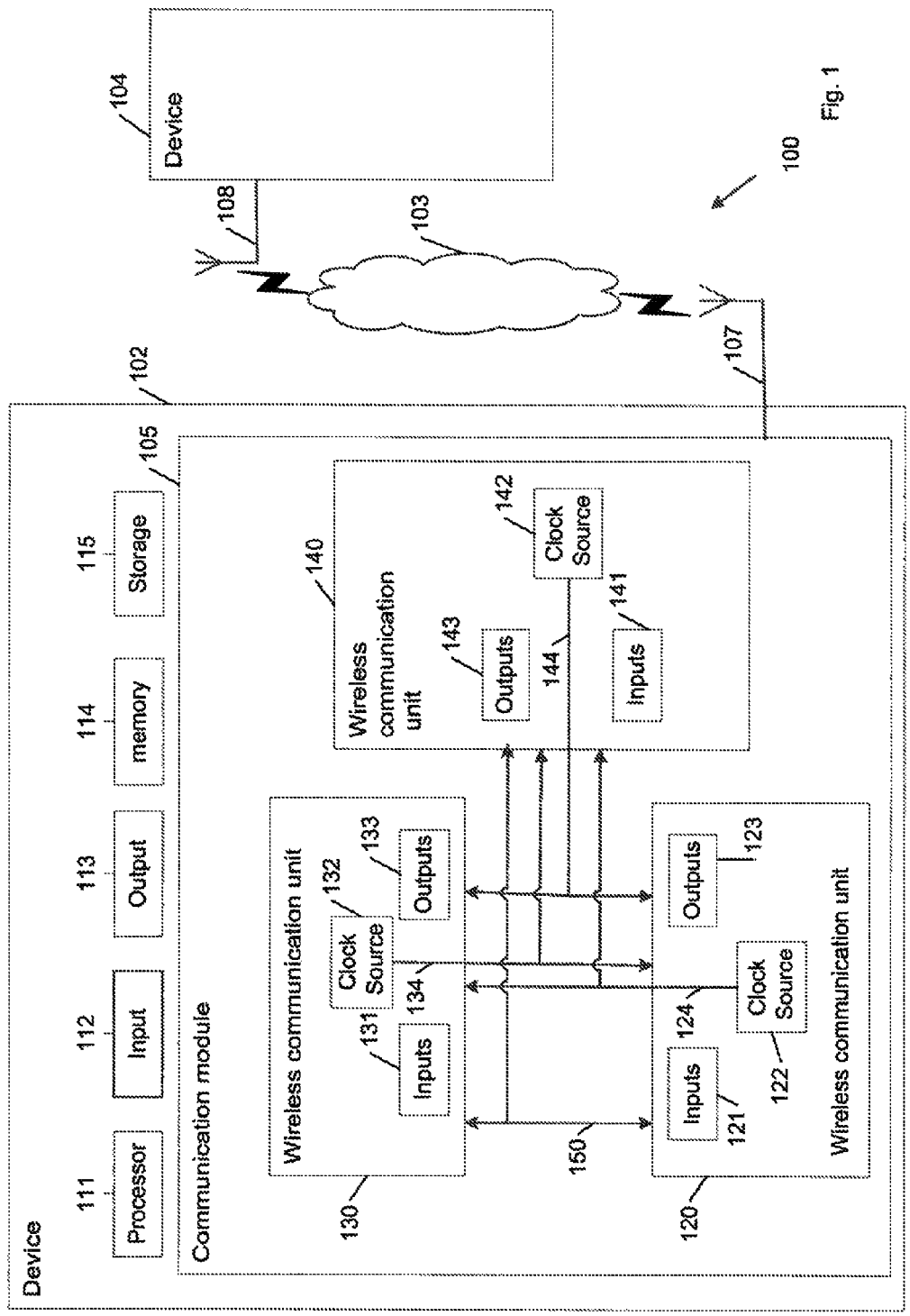
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 802.11-2007: Standard for Information technology—Telecommunications and information exchange between systems—Local and metropolitan area networks—Specific requirements, Part 11: Wireless LAN Medium Access Control (MAC) and Physical Layer (PHY) Specifications—June* 2007), 802.11n (*"IEEE 802.11n-2009—Amendment 5: Enhancements for Higher Throughput. IEEE-SA. 29 Oct.* 2009"), 802.11ac ("*Very High Throughput <6 Ghz*"), 802.11 task group ad (TGad) ("*Very High Throughput 60 GHz*"), and/or future versions and/or derivatives thereof, devices, and/or networks operating in accordance with IEEE 802.16 standards ("the 802.16 standards"), e.g., including 802.16 (*IEEE-Std 802.16, 2004 Edition, Air Interface for Fixed Broadband Wireless Access Systems*), 802.16d, 802.16e (*IEEE-Std 802.16e, 2005 Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Global Navigation Satellite System (GNSS) device, a device having one or more internal antennas and/or external antennas, Digital Video Broadcast (DVB) devices or systems, multi-standard radio devices or systems, a Hybrid Digital Radio (HDR), a Frequency Modulation (FM) radio, a wired or wireless handheld device (e.g., BlackBerry), a Wireless Application Protocol (WAP) device, Bluetooth (BT) device, a Near Field Communication (NFC) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), Bluetooth (BT), Hybrid Digital Radio (HDR), Frequency Modulation (FM), Near Field Communication (NFC), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

The term "communicating" as used herein with respect to information includes transmitting the information and/or receiving the information. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. Information may be communicated, for example, between first and second modules by transferring the information from the first module to the second module and/or by transferring the information from the second module to the first module.

Reference is now made to FIG. 1, which schematically illustrates a block diagram of a system 100, in accordance with some demonstrative embodiments.

In some demonstrative embodiments, system 100 may include a wireless communication device 102 capable of communicating content, data, information and/or signals over wireless communication mediums 103. For example, device 102 may include a wireless communication module 105 capable of communicating over wireless mediums 103 via one or more antennas 107.

In some demonstrative embodiments, wireless mediums 103 may include for example, a Radio Frequency (RF) channel, a WiFi channel, a Bluetooth channel, a cellular channel, a GNSS Channel, a NFC channel, a HDR channel, a FM channel, and the like.

In some demonstrative embodiments, antennas 107 may include any type of antennas suitable for transmitting and/or receiving wireless communication signals, blocks, frames, transmission streams, packets, messages and/or data. Types of antennas that may be used for antennas 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication module 105 may include a plurality of co-located wireless communication units configured to receive wireless communication signals via one or more antennas 107. For example, wireless communication module 105 may include a first wireless communication unit 120, a second wireless communication unit 130 and/or a third wireless communication unit 140. Two or more of wireless communication units 120, 130 and/or 140 may utilize a shared common antenna 107 and/or two or more of wireless communication units 120, 130 and/or 140 may utilize separate dedicated antennas 107.

In some demonstrative embodiments, the plurality of wireless communication units may include one or more global navigation satellite system (GNSS) wireless communication units, one or more wireless-fidelity (WiFi) wireless communication units, one or more Bluetooth (BT) wireless communication units, one or more cellular wireless communication units, e.g., a second generation cellular (2G) communication unit, a third generation cellular (3G) communication unit, a Universal Mobile Telecommunication System (UMTS) communication unit, a Long Term Evolution (LTE) communication unit, one or more near field communication (NFC) wireless communication units and/or one or more digital radio (DR) wireless communication unit, and the like.

For example, wireless communication unit 120 may include a GNSS wireless communication unit, wireless communication unit 130 may include a cellular wireless communication unit and wireless communication unit 140 may include a DR wireless communication unit.

In some demonstrative embodiments, wireless communication units 120, 130 and 140 may include any other wireless communication unit.

In some demonstrative embodiments, wireless communication units 120, 130 and 140 may receive wireless communication signals transmitted from one or more devices 104 via antennas 108. For example, devices 104 may include one or more GNSS satellites, one or more cellular source transmitters, e.g., cellular base stations, cellular operators, cellular antennas and the like, one or more digital radio stations, one or more BT devices, one or more WiFi hotspots or AP's, one or more NFC devices, and the like.

In some demonstrative embodiments, wireless communication units 120, 130 and 140 may include at least two clock sources configured to generate at least two clock signals, respectively. For example, each of wireless communication units 120, 130 and 140 may include a clock source configured to generate a clock signal. In one example, wireless communication unit 120 may include a GNSS clock source 122 to generate a GNSS clock signal 124, wireless communication unit 130 may include a cellular clock source 132 to generate a cellular clock signal 134, and/or wireless communication unit 140 may include a digital radio clock source 142 to generate a digital radio clock signal 144. In another example, one or more of wireless communication units 120, 130 and 140 may not have a clock source, e.g., wireless communication unit 140 may not include digital radio clock source 142.

In some demonstrative embodiments, a wireless communication unit of wireless communication units 120, 130 and 140 may utilize the clock signal generated by the clock source of the wireless communication unit to perform one or more functionalities. In one example, wireless communication unit 120 may utilize clock signal 124 to enable a relatively quick acquiring of one or more satellites of the GNSS system, which may enable device 102 to estimate the location of device 102. In another example, wireless communication unit 130 may utilize clock signal 134 to search and/or communicate with the cellular base stations.

In some demonstrative embodiments, a clock source of clock sources 122, 132 and 142 may be synchronized to one or more clock origins of devices 104. For example, GNSS clock source 122 may be synchronized to a clock origin of a GNSS satellite, e.g., while tracking the GNSS satellite; cellular clock source 132 may be synchronized to a clock origin of a cellular base station, e.g., while communicating with the base station, and/or DR clock source 142 may be synchronized to a clock origin of a radio station; e.g., while communicating with the radio station. The clock origins may have accurate clock information.

In some demonstrative embodiments, a synchronized clock source may have one or more improved clock characteristics, e.g., a better accuracy, compared to a clock source, which has not been synchronized for a relatively long period of time. For example, clock source 122 may be more accurate than clock source 132, e.g., upon synchronization of clock source 122 with a clock origin of the GNSS satellite, whereas wireless communication unit 130 may be in idle mode.

In some demonstrative embodiments, wireless communication units 120, 130 and 140 may utilize a clock signal, e.g., clock signal 124, as a common master clock signal configured to be commonly used by wireless communication units 120, 130 and 140. The common master clock signal may be distributed between wireless communication units 120, 130 and 140. For example, wireless communication unit 120 may utilize clock signal 124 to acquire a satellite of the GNSS system, wireless communication unit 130 may utilize clock signal 124 to communicate with the cellular base station, and/or wireless communication unit 140 may utilize clock signal 124 to search for the digital radio station.

In some demonstrative embodiments, wireless communication units 120, 130 and 140 may switch between commonly using clock signal 124 as the common master clock signal and commonly using another clock signal, e.g., clock signal 134, as the common master clock signal. For example, wireless communication units 120, 130 and 140 may switch to utilize clock signal 134 as the master clock signal, e.g., when wireless communication unit 120 becomes inactive, e.g., when wireless communication unit 120 switches to a power save mode or an idle mode, and/or when clock source 132 becomes, for example, more accurate, e.g., due to synchronization to the cellular base station.

In some demonstrative embodiments, wireless communication units 120, 130 and 140 may dynamically switch between clock signal 124 and clock signal 134 as the master clock signal, based on at least one criterion. For example, wireless communication units 120, 130 and 140 may receive clock signal 124 as the master clock signal for a first period of time, and wireless communication units 120, 130 and 140 may receive clock signal 134 as the master clock signal for a second period of time, e.g., after switching to clock signal 134.

In some demonstrative embodiments, the at least one criterion may relate to one or more clock characteristics of clock sources 122 and 132, one or more Key Performance Indicators (KPIs) of clock sources 122 and 132, and/or any other quality parameter related to clock sources 122 and 132. For example, the criterion may include an availability criterion related to an availability of clock signals 124 and 134, a validity criterion related to a validity of clock signals 124 and 134, a quality criterion related to an accuracy, noise level, a phase noise and/or a jitter of clock signals 124 and 134, e.g., an accuracy criterion related to an accuracy of clock signals 124 and 134. For example, clock signal 124 may have a first accuracy related to an accuracy of clock source 122, and clock signal 134 may have a second accuracy related to an accuracy of clock source 132, e.g., which is greater than the first accuracy. Accordingly, wireless communication units 120, 130 and 140 may switch to clock signal 134, which is more accurate.

For example, wireless communication units 120, 130 and 140 may utilize clock signal 124 from clock source 122 as the master clock signal, e.g., when wireless communication unit 120 is tracking the GNSS satellite, and may dynamically switch to utilize clock signal 134 from clock source 132 as the master clock signal, for example, when clock signal 134 has relatively improved clock characteristics, e.g., accuracy, compared to clock signal 124, e.g., when wireless communication unit 130 starts to communicate with the cellular base station and/or wireless communication unit 120 discontinues to track the GNSS satellite.

Accordingly, wireless communication unit 130 may be able to utilize clock source 122, e.g., when clock source 122 is more accurate, to search for the cellular base station, e.g., when wireless communication unit 120 wakes up from idle mode and/or power save mode. Wireless communication unit 120 may be able to utilize clock source 132, e.g., when clock source 122 is more accurate, to reacquire a satellites of the GNSS, e.g., when wireless communication unit 120 wakes up from idle mode and/or power save mode.

In some demonstrative embodiments, wireless communication unit 120 may select which one of clock signals 124 and 134 may be utilized as the master clock signal. For example, wireless communication unit 120 may select the master clock signal based on the at least one criterion, e.g., as described above.

In some demonstrative embodiments, another wireless communication unit of wireless communication units 120, 130 and 140, e.g., wireless communication unit 140, may select which one of clock signals 124 and 134 may be utilized as the master clock signal.

In some demonstrative embodiments, device 102 may include an interface 160 configured to enable communication between wireless communication units 120, 130 and 140. For example, interface 160 may enable wireless communication unit 120 to select, which one of clock signals 124 and 134 may be utilized as the master clock signal and/or may distribute the master clock signal between wireless communication units 120, 130 and 140, e.g., as described below.

In some demonstrative embodiments, interface 160 may be configured to communicate control messages 150 including one or more values configured to enable the dynamic switching between clock sources. For example, control messages 150 may include one or more values corresponding to the at least one criterion. For example, control messages 150 may include one or more availability values related to the availability of clock sources 124, 134 and 144. Wireless communication unit 120 may select which one of clock signals 124 and 134 may be utilized as the master clock signal, for example, based on the availability values. For example, wireless communication unit 120 may utilize the availability values to select an available clock source, based on a priority list of clock sources 122, 132 and 142, e.g., as described below.

In some demonstrative embodiments, interface 160 may include one or more clock inputs to provide clock signals to wireless communication units 120, 130 and/or 140. For example, each wireless communication units 120, 130 and 140 may include one or more clock inputs configured to receive one or more clock signals, e.g., clock signals 124, 134 and 144. For example, wireless communication unit 120 may include clock inputs 121, wireless communication unit 130 may include clock inputs 131, and/or wireless communication unit 140 may include clock inputs 141.

In some demonstrative embodiments, interface 160 may include one or more clock outputs configured to provide clock signals 124, 134 and 144 from wireless communication units 120, 130, and/or 140. For example, each of wireless communication units 120, 130 and/or 140 may include an output, e.g., wireless communication unit 120 may include a clock output 123 configured to provide clock signal 124, wireless communication unit 130 may include a clock output 133 configured to provide clock signal 134, and/or wireless communication unit 140 may include a clock output 143 configured to provide a clock signal 144.

In some demonstrative embodiments, a clock signal of clock signals 124, 134 and 144 may include raw clock data. For example, the clock raw data may include time, frequency, and/or date information in any suitable format.

In some demonstrative embodiments, a clock source of clock sources 122, 132 and 142 may provide correction information corresponding to the raw clock data of the clock source. The clock correction information may include any quality information corresponding to the clock source, e.g., a KPI parameter corresponding to performance of the clock source, and/or any other quality parameter.

For example, the correction information may include a temperature parameter corresponding to a temperature of the clock source. The KPI parameter may include a noise parameter corresponding to a noise of the clock source, an accuracy parameter corresponding to an accuracy of the clock source, a stability parameter corresponding to a stability of the clock source, and/or any other quality parameter. For example, GNSS clock source 122 may provide correction information corresponding to the raw clock data of signal 124 including a physical parameter, e.g., a temperature parameter, corresponding to a temperature of clock source 122.

In some demonstrative embodiments, the clock correction information may include a clock time correction to be applied to correct the raw clock data of the clock source.

For example, the clock time correction may include information to correct the raw clock data, e.g., a function to correct the raw clock data, a difference between the raw clock data and an accurate time, accurate date, accurate frequency, and/or any other parameter. For example, GNSS clock source 122 may provide correction information corresponding to the raw clock data of signal 124 including information to correct the raw clock data of GNSS clock source 122, e.g., a difference in milliseconds between an accurate time and the time of the clock raw data.

In some demonstrative embodiments, a wireless communication unit of wireless communication units 120, 130 and 140 may provide feedback to another wireless communication unit of wireless communication units 120, 130 and 140 including a clock time correction corresponding to a clock source of the other wireless communication unit. For example, wireless communication unit 120 may provide feedback to wireless communication unit 130. In one example, clock signal 134 may be utilized as the master clock signal. Wireless communication unit 120 may receive the master clock signal and may compare the raw data of the master clock signal to the raw data of clock source 122, e.g., which may be synchronized with a clock origin of the GNSS satellite. Accordingly, wireless communication unit 120 may determine a difference between the clock origin of the GNSS satellite and clock source 132. Wireless communication unit 120 may provide the feedback to wireless communication unit 130 indicating the time difference between the clock origin of the GNSS satellite and clock source 132. The feedback may enable wireless communication unit 130 to adjust and/or improve an accuracy of clock source 132 and/or to improve the performance of wireless communication unit 130.

In some demonstrative embodiments, a wireless communication unit of wireless communication units 120, 130 and 140 may switch between a master mode, in which the wireless communication unit provides the master clock signal, and a slave mode, in which the wireless communication unit receives the master clock signal from another wireless communication unit of wireless communication units 120, 130 and 140. For example, unit 120 may switch to the master mode, e.g., when clock signal 124 is utilized as the master clock signal, and may switch to the slave mode, e.g., when clock signal 134 is utilized as the master clock signal.

In some demonstrative embodiments, wireless communication unit 120 may switch off clock source 122 when clock signal 124 is not being utilized as the master clock signal. For example, unit 120 may switch off clock source 122, when wireless communication unit 120 is at the slave mode. In another example, each of wireless communication units 120, 130 and 140 may switch off clock sources 122, 132, and 142, respectively, e.g., when in the slave mode.

Accordingly, device 102 may utilize the switching between the clock sources to reduce a power consumption of device 102. In one example, switching between clock signals 124 and 134 may improve a power utilization of device 102, e.g., due to switching off clock sources 122, 132, and/or 142, while in the slave mode. In another example, switching between clock signals 124 and 134 may enable relatively longer periods of idle time for clock sources 122, 132 and 142.

In some demonstrative embodiments, device 102 may reduce an acquisition time for acquiring a satellite of the GNSS satellites, e.g., due to utilizing cellular clock signal 134, which may be more accurate than GNSS clock signal 124. In another example, device 102 may not have to synchronize cellular clock source 132, which may be utilized for one or more cellular applications, e.g., by utilizing GNSS clock signal 124, which may be more accurate than cellular clock signal 134.

In some demonstrative embodiments, the switching between clock signals 124 and 134 may enable a low cost implementation of device 102. For example, device 102 may be able to utilize clock sources of reduced cost and/or accuracy, e.g., clock sources 122, 132 and 142, may have relatively inferior physical attributes, since, for example, the switching between clock signals 124 and 134 may enable utilizing a more accurate clock source, and/or the feedback between clock sources may enable to improve an accuracy of a clock source e.g., as described above.

In some demonstrative embodiments, device 102 may have an increased level of availability. For example, device 102 may be able to utilize a clock source of clock sources 124, 134, and 144, e.g., even when another clock source of clock sources 124, 134, and 144 may not work, may not operate and/or may not be available.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may include, for example, one or more of a processor 111, an input unit 112, an output unit 113, a memory unit 114, and a storage unit 115. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) of wireless communication device 102, and/or of one or more suitable applications.

Input unit 112 includes, for example, a keyboard, a keypad, a mouse, a touch-pad, a track-ball, a stylus, a microphone, a touch screen or other suitable pointing device or input device. Output unit 113 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a DVD drive, or other suitable removable or non-removable storage units. Memory unit 114 and/or storage unit 115, for example, may store data processed by wireless communication device 102.

Figure 2:
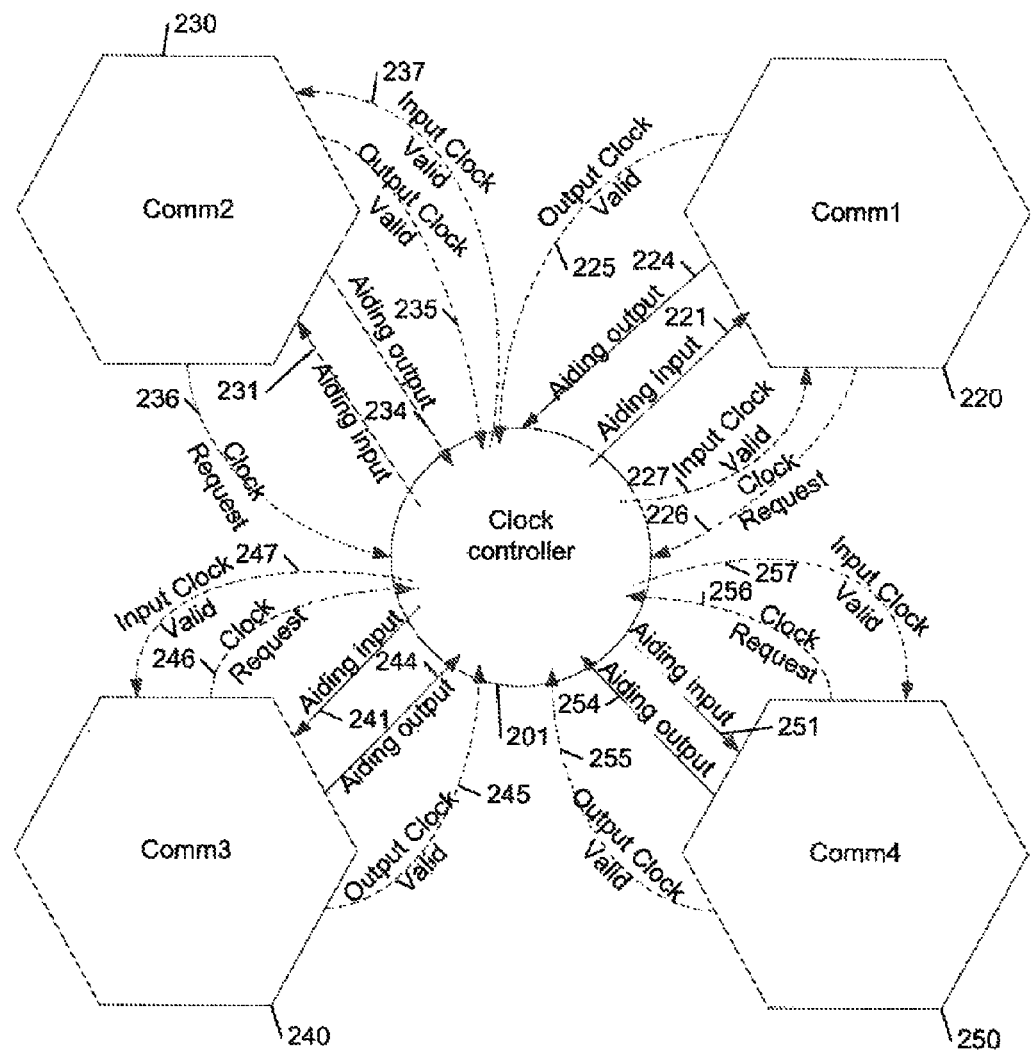
FIG. 2 is a schematic block diagram of a centralized clock distribution scheme, in accordance with some demonstrative embodiments.

Reference is now made to FIG. 2, which schematically illustrates a system 200 including a clock controller 201 and a plurality of wireless communication units, e.g., a wireless communication unit 220, a wireless communication unit 230, a wireless communication unit 240 and a wireless communication unit 250. Wireless communication units 220, 230, 240 and 250 may perform the functionality of wireless communication units 120, 130 and/or 140 (FIG. 1).

In some demonstrative embodiments, clock controller 201 may be configured to receive clock signals from wireless communication units 220, 230, 240 and 250. For example, clock controller 201 may receive clock signal 224 from unit 220, clock signal 234 from unit 230, clock signal 244 from unit 240, clock signal 254 from unit 250, and/or clock signal 224 from unit 220. For example, clock signals 224, 234, 244 and/or 254 may perform the functionality of clock signals 124, 134, and/or 144 (FIG. 1).

In some demonstrative embodiments, clock controller 201 may be able to select a clock signal from the clock signals, and to provide the selected clock signal to the plurality of wireless communication units.

In some demonstrative embodiments, clock controller 201 may provide the selected clock signal to an aiding input of wireless communication units 220, 230, 240 and 250, e.g., an aiding input 221 of unit 220, an aiding input 231 of unit 230, an aiding input 241 of unit 240 and/or an aiding input 251 of unit 250.

In some demonstrative embodiments, clock controller 201 may provide the selected clock signal based on clock requests from wireless communication units 220, 230, 240 and/or 250, e.g., a clock request 226 from unit 220, a clock request 236 from unit 230, a clock request 246 from unit 240 and/or a clock request 256 from unit 250, e.g., as described below.

In some demonstrative embodiments, clock controller 201 may select the selected clock signal based on a predefined criterion, e.g., as described below.

In some demonstrative embodiments, clock controller 201 may receive control messages from wireless communication units 220, 230, 240 and/or 250, e.g., a control message 225 from unit 220, a control message 235 from unit 230, a control message 245 from unit 240, and/or a control message 255 from unit 250. Control messages 225, 235, 245 and/or 255 may include one or more values corresponding to the predefined criterion. For example, the predefined criterion may include a validity criterion related to a validly of a clock signal of clock signals 224, 234, 244 and/or 254. According to this example, control messages 225, 235, 245 and/or 255 may include a value indicating whether or not the clock signal of is valid. For example, control messages 225, 235, 245 and/or 255 may perform the functionality of control messages 150 (FIG. 1), e.g., as described above.

In some demonstrative embodiments, clock controller 201 may provide the selected clock signal to wireless communication units 220, 230, 240 and/or 250 via aiding inputs 221, 231, 241 and/or 251.

In some demonstrative embodiments, clock controller 201 may send indications to wireless communication units 220, 230, 240 and/or 250 to indicate that the selected clock signal is available for use by wireless communication units 220, 230, 240 and/or 250, e.g., an indication 227 to unit 220, an indication 237 to unit 230, an indication 247 to unit 240 and/or an indication 257 to unit 250.

In some demonstrative embodiments, system 200 may enable increasing a number of the plurality of wireless communication units, e.g., by adding one or more wireless communication units to system 200. Increasing the number of the wireless communication units may be possible by modifying and scaling only clock controller 201, e.g., there is no need to change or modify wireless communication units 220, 230, 240 and 250.

Figure 3:
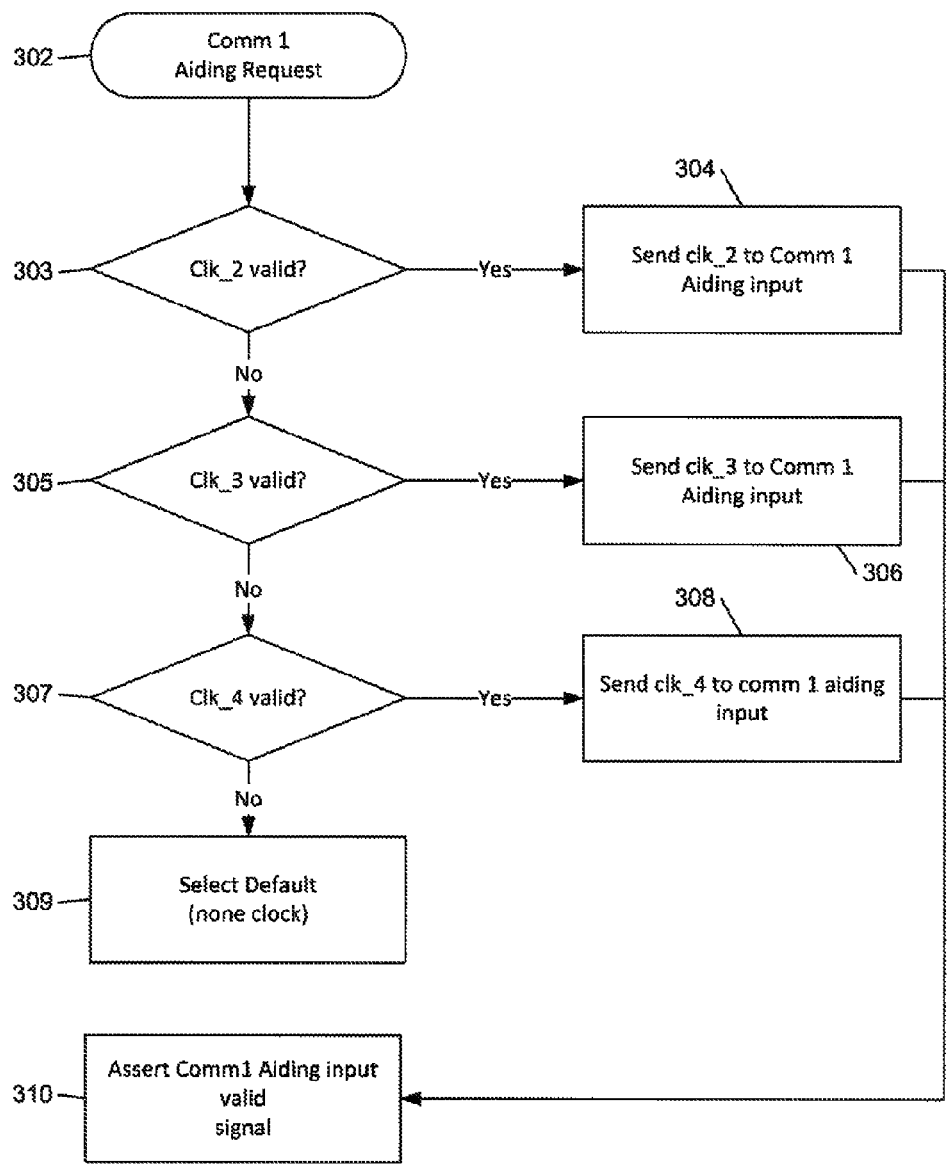
FIG. 3 is a schematic flow chart illustration of a method of providing a clock signal, in accordance with some demonstrative embodiments.

Reference is now made to FIG. 3, which schematically illustrates a method of clock signal selection by a clock controller, in accordance with some demonstrative embodiments. In some embodiments, one or more of the operations of the method of FIG. 3 may be performed by any suitable system, e.g., system 200 (FIG. 2) and/or a clock controller, e.g., clock controller 201 (FIG. 2).

As indicated at block 302, the method may include receiving a clock request from a first wireless communication unit. For example, clock controller 201 (FIG. 2) may receive clock request 226 (FIG. 2) from wireless communication unit 220 (FIG. 2), e.g., as described above.

In some demonstrative embodiments, the clock controller, e.g., clock controller 201 (FIG. 2) may determine a selected clock signal to be provided to the first wireless communication unit based on a priority order list of clock sources of the wireless communication units. For example, the clock controller may evaluate a predefined criterion, e.g., a validity criterion related to a validity of clock signals, according to the priority order list of the clock sources. For example, the priority order may be based on an accuracy of the clock sources. For example, a first clock source having a first accuracy may be evaluated before a second clock source having a second accuracy, e.g., if the first clock source is more accurate than the second clock source. For example, clock controller 201 (FIG. 2) may check a validity of GNSS clock signal, e.g., clock signal 124 (FIG. 1), before checking a validity of a cellular clock signal, e.g., cellular clock signal 134 (FIG. 1), if the GNSS clock signal is more accurate than the cellular clock signal.

As indicated at block 303, the method may include determining whether or not a clock signal of a second wireless communication unit is valid. For example, clock controller 210 (FIG. 2) may determine if clock signal 234 (FIG. 2) of wireless communication unit 230 (FIG. 2) is valid based on control message 235 (FIG. 2), e.g., as described above.

As indicated in block 304, the method may include providing the clock signal of the second wireless communication unit to the first wireless communication unit via an aiding input of the first wireless communication unit, e.g., if the second clock signal is valid. For example, clock controller 210 (FIG. 2) may provide clock signal 234 (FIG. 2) to wireless communication unit 220 (FIG. 2) via aiding input 221 (FIG. 2), e.g., as described above.

As indicated at block 305, the method may include determining whether or not a clock signal of a third wireless communication unit is valid, e.g., if the second clock signal is not valid. For example, clock controller 210 (FIG. 2) may determine if clock signal 244 (FIG. 2) of wireless communication unit 240 (FIG. 2) is valid, based on control message 245 (FIG. 2), e.g., as described above.

As indicated in block 306, the method may include providing the clock signal of the third wireless communication unit to the first wireless communication unit via an aiding input of the first unit, e.g., if the third clock signal is valid. For example, clock controller 210 (FIG. 2) may provide clock signal 244 (FIG. 2) to wireless communication unit 220 (FIG. 2) via aiding input 221 (FIG. 2), e.g., as described above.

As indicated in block 307, the method may include determining whether or not a clock signal of a fourth wireless communication unit is valid, e.g., if the third clock signal is not valid. For example, clock controller 210 (FIG. 2) may determine if clock signal 254 (FIG. 2) of wireless communication unit 250 (FIG. 2) is valid, based on control message 255 (FIG. 2), e.g., as described above.

As indicated in block 308, the method may include providing the clock signal of the fourth wireless communication unit to the first wireless communication unit via an aiding input of the first wireless communication unit, e.g., if the fourth clock signal is valid. For example, clock controller 210 (FIG. 2) may provide clock signal 254 (FIG. 2) to wireless communication unit 220 (FIG. 2) via aiding input 221 (FIG. 2), e.g., as described above.

As indicated in block 309, the method may include not providing a clock signal to the first wireless communication unit, e.g., if the fourth clock signal is not valid. For example, clock controller 210 (FIG. 2) may not provide any clock signal to wireless communication 220 (FIG. 1), e.g., if clock signal 234 (FIG. 2), clock signal 244 (FIG. 2) and clock signal 254 (FIG. 2) are not valid.

As indicated in block 310, the method may include providing an indication to the first wireless communication unit that the selected clock signal is available for use by the first wireless communication unit. For example, clock controller 210 (FIG. 2) may provide indication 227 (FIG. 2) to wireless communication unit 220 (FIG. 2), e.g., as described above.

Figure 4:
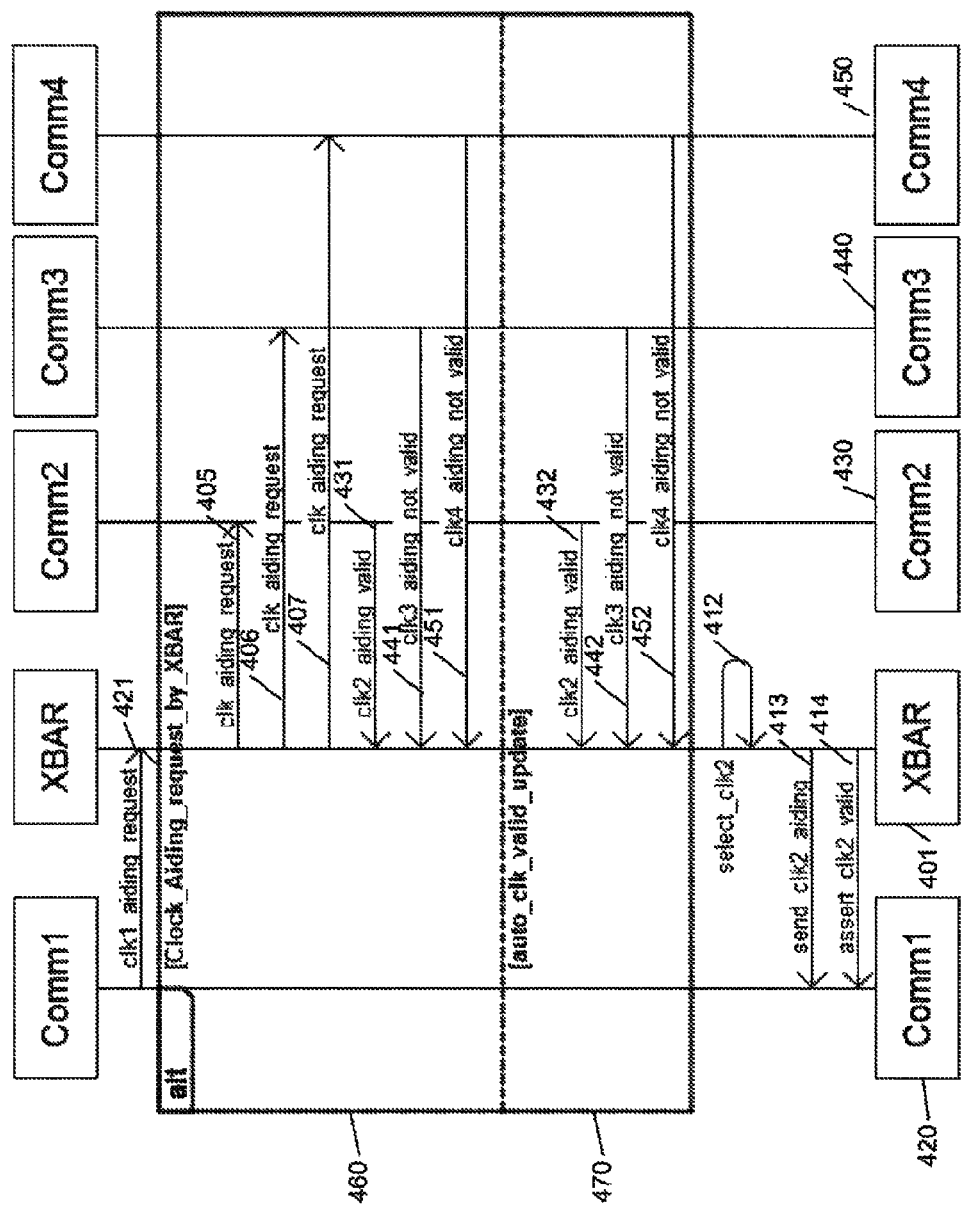
FIG. 4 is a schematic sequence diagram of operations between a clock controller and a plurality of wireless communication units, in accordance with some demonstrative embodiments.

Reference is now made to FIG. 4, which schematically illustrates a sequence diagram 400, which demonstrates operations and interactions between a clock controller 401 (XBAR), e.g., clock controller 201 (FIG. 2) and a plurality of wireless communication units, e.g., wireless communication unit 420, wireless communication unit 430, wireless communication unit 440 and wireless communication unit 450 (denoted COMM1, COMM2, COMM3 and COMM4, respectively), in accordance with some demonstrative embodiments. For example, wireless communication units 420, 430, 440 and 450, may perform the functionality of wireless communication units 220, 230, 240 and 250 (FIG. 2), respectively.

As shown in FIG. 4, unit 420 may send a clock request 421 to clock controller 401. In response to clock request 421, clock controller 401 may perform an operation 412 of selecting a clock signal, e.g., a clock signal of unit 430.

As shown in FIG. 4, clock controller 401, may provide the selected clock signal 413 to unit 420, and may send an indication 414 to wireless communication unit 420 indicating that the selected clock signal 413 is available for use by unit 420.

As indicated at block 460, clock controller 410 may send controller requests ("aiding requests") to wireless communication units 430, 440 and/or 450, e.g., a controller request 405 to wireless communication unit 430, a controller request 406 to wireless communication unit 440, and/or a controller request 407 to wireless communication unit 450, for example, before performing operation 412 of selecting the clock signal.

As shown in FIG. 4, in response to the controller requests, a wireless communication unit may send a control message including a value corresponding to a predefined criterion, e.g., a validity criterion related to a validity of a clock signal. For example, the control message may include a first value, e.g., one, indicating the clock signal is valid, or a second value, e.g., zero, indicating the clock signal is not valid. For example, clock controller 401 may receive a control message 431 from wireless communication unit 430, a control message 441 from wireless communication unit 440 and a control message 451 from wireless communication unit 450.

As shown in FIG. 4, only control message 431 may include a value indicating that a clock signal of wireless communication unit 430 is valid, e.g., while the clock signals of wireless communication units 440 and 450 may not be valid.

As indicated at block 470, wireless communication units 430, 440 and/or 450 may automatically update clock controller 401 and may send control signals to clock controller 410, e.g., without receiving the controller request from clock controller 401. For example, wireless communication unit 430 may send a control message 432, wireless communication unit 440 may send a control message 442 and/or wireless communication unit 450 may send control message 452. In one example, a wireless communication unit may send the control message when there is a change in the state of the clock signal, e.g., when the clock signal becomes valid or not valid. In another example, the wireless communication unit may send the control message periodically, e.g. at a predefined time interval.

In some demonstrative embodiments, clock controller 401 may select clock signal 413, e.g., if clock signal 413 of wireless communication unit 430 is the only valid clock signal.

Figure 5:
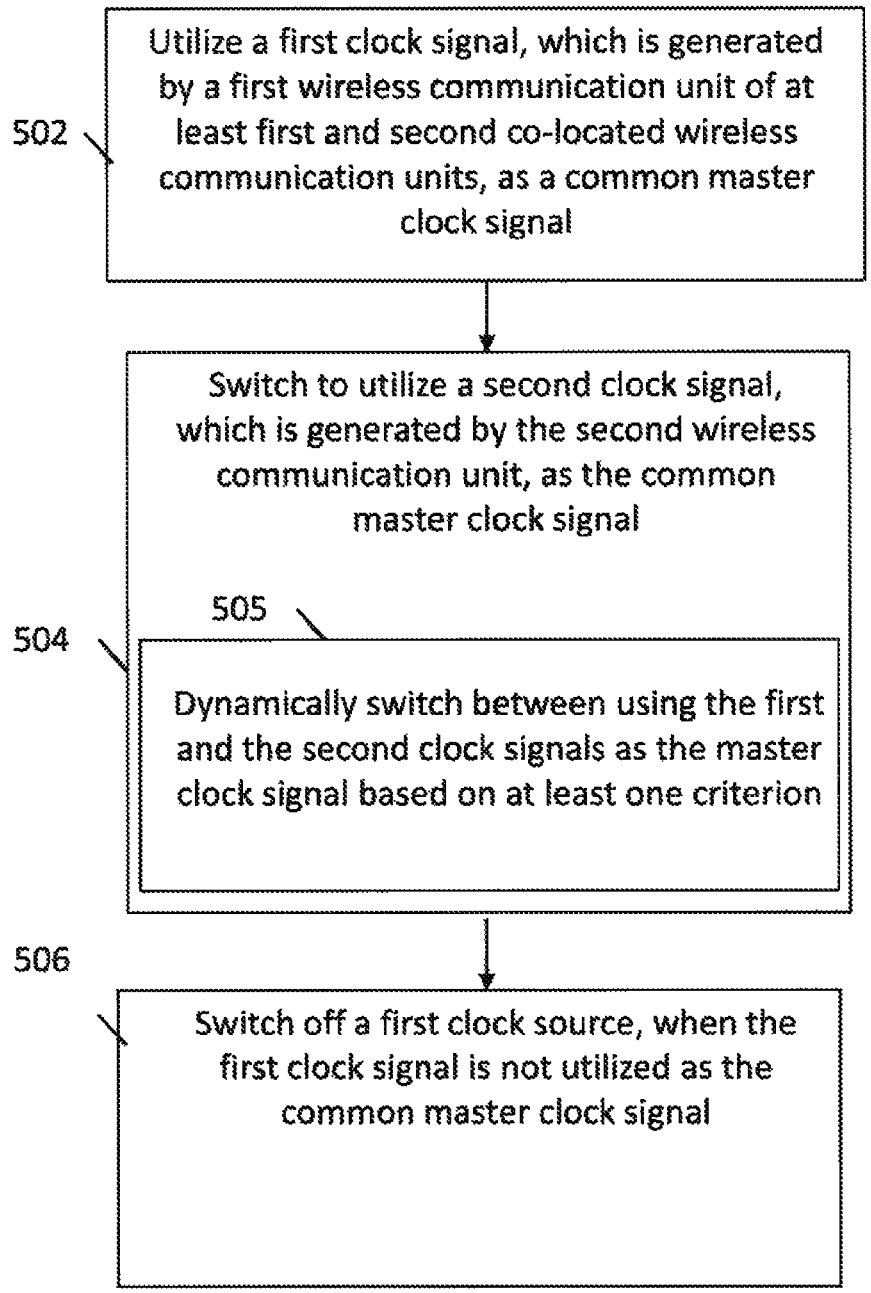
FIG. 5 is a schematic flow chart illustration of a method of clock distribution, in accordance with some demonstrative embodiments.

Reference is made to FIG. 5, which schematically illustrates a method of clock distribution, in accordance with some demonstrative embodiments. In some embodiments, one or more of the operations of the method of FIG. 5 may be performed by any suitable system, e.g., system 100 (FIG. 1) and/or wireless communication device, e.g., device 102 (FIG. 1) and or communication module, e.g., communication module 105 (FIG. 1).

As indicated at block 502, the method may include utilizing a first clock signal, which is generated by a first wireless communication unit of at least first and second co-located wireless communication units, as a common master clock signal for the at least first and second wireless communication units. For example, clock signal 124 (FIG. 1) generated by wireless communication unit 120 (FIG. 1) may be utilized as a common master clock signal for wireless communication unit 120 (FIG. 1) and wireless communication unit 130 (FIG. 1), e.g., as described above.

As indicated at block 504, the method may include switching to utilize a second clock signal, which is generated by the second wireless communication unit, as the common master clock signal for the at least first and second wireless communication units. For example, wireless communication units 120, 130 and 140 (FIG. 1) may switch to utilize clock signal 134 (FIG. 1) generated by wireless communication unit 130 (FIG. 1) as a common master clock signal, e.g., as described above.

As indicated at block 505, switching to utilize the second clock signal may include dynamically switching between using the first and the second clock signals as the master clock signal based on at least one criterion. For example, wireless communication units 120, 130 and 140 may dynamically switch between using clock signals 134 and 124 (FIG. 1) based on the predefined criterion, e.g., as described above.

A indicated at block 506, the method may include switching off the first clock source, when the first clock signal is not utilized as the common master clock signal. For example, wireless communication unit 120 (FIG. 1) may switch off clock source 122 (FIG. 1), when clock signal 134 (FIG. 1) is utilized as the common master clock signal, e.g., as described above.

Figure 6:
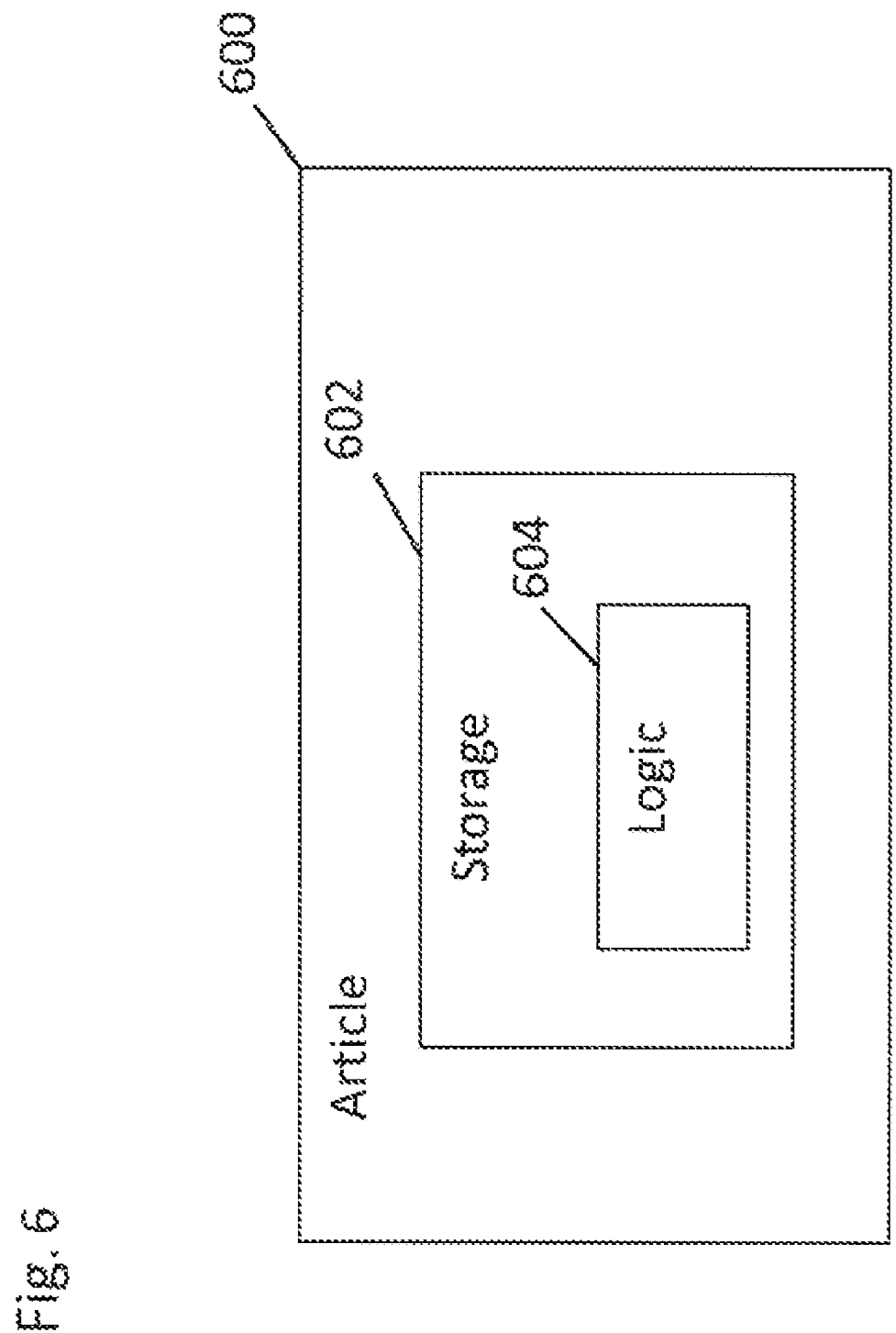
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a non-transitory machine-readable storage medium 602 to store logic 604, which may be used, for example, to perform at least part of the functionality of wireless communication units 120, 130 and/or 140 (FIG. 1), clock controller 201 (FIG. 2), to perform one or more operations of the method of FIG. 3 and/or to perform one or more operations of the method of FIG. 5. The phrase "non-transitory machine-readable medium" is directed to include all computer-readable media, with the sole exception being a transitory propagating signal.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
a plurality of wireless communication units including at least a first wireless communication unit and a second wireless communication unit, the first wireless communication unit including a first clock source to generate a first clock signal, and a the second wireless communication unit including a second clock source to generate a second clock signal,
wherein said plurality of wireless communication units are to dynamically switch between commonly using said first clock signal as a common master clock signal and commonly using said second clock signal as said common master clock signal based on at least one criterion selected from the group consisting of a quality criterion, a key performance indicator (KPI) criterion, an accuracy criterion related to an accuracy of said first and second clock signals, an availability criterion related to an availability of said first and second clock signals, and a validity criterion related to a validity of said first and second clock signals.

2. The device of claim 1, wherein said first wireless communication unit includes a clock output to provide said first clock signal to said plurality of wireless communication units, and a clock input to receive said second clock signal.

3. The device of claim 1, wherein a wireless communication unit of said plurality of wireless communication units is to select which of said first and second clock signals is to be utilized as said common master clock signal.

4. The device of claim 1 comprising a clock controller to receive said first and second clock signals, to select a selected clock signal from said first and second clock signals, and to provide the selected clock signal to said plurality of wireless communication units.

5. The device of claim 1, wherein at least one clock source of said first and second clock sources comprises a clock source selected from the group consisting of a global navigation satellite system (GNSS) clock source, a wireless-fidelity (WiFi) clock source, a Bluetooth (BT) clock source, a cellular clock source, a near field communication (NFC) clock source, and a digital radio (DR) clock source.

6. The device of claim 1, wherein said first clock source is to provide said first clock signals including raw clock data.

7. The device of claim 6, wherein said first clock source is to provide clock correction information corresponding to said raw clock data, said clock correction information including at least one parameter selected from the group consisting of a quality parameter, a key performance indicator (KPI), a physical parameter corresponding to a physical attribute of said first clock source, and a clock time correction to correct said raw clock data.

8. The device of claim 1, wherein said first wireless communication unit is to switch off said first clock source, when said first clock signal is not being utilized as said common master clock signal.

9. A wireless communication system comprising:
at least one wireless communication device comprising:
at least one antenna; and
a wireless communication unit to communicate via said at least one antenna, said wireless communication unit including a clock source to generate a first clock signal, wherein said wireless communication unit is to switch between a master mode, in which said wireless communication unit is to provide said first clock signal as a master clock to at least one other wireless communication unit co-located on said wireless communication device, and a slave mode, in which said wireless communication unit is to receive a second clock signal as the master clock from said other wireless communication unit,
wherein said wireless communication unit is to dynamically switch between said master mode and slave mode based on at least one criterion selected from the group consisting of a quality criterion, a key performance indicator (KPI) criterion, an accuracy criterion related to an accuracy of said first and second clock signals, an availability criterion related to an availability of said first and second clock signals, and a validity criterion related to a validity of said first and second clock signals.

10. The wireless communication system of claim 9, wherein said wireless communication unit includes a clock output to provide said first clock signal to said other wireless communication unit, and a clock input to receive said second clock signal form the other wireless communication unit.

11. The wireless communication system of claim 9, comprising a clock controller to receive said first and second clock signals, to select a selected clock signal from said first and second clock signals, and to provide the selected clock signal to said wireless communication unit.

12. The wireless communication system of claim 9, wherein said clock source comprises a clock source selected from the group consisting of a global navigation satellite system (GNSS) clock source, a wireless-fidelity (WiFi) clock source, a Bluetooth (BT) clock source, a cellular clock source, a near field communication (NFC) clock source, and a digital radio (DR) clock source.

13. The wireless communication system of claim 9, wherein said wireless communication unit is to switch off said clock source, when sais first clock signal is not being utilized as said master clock.

14. A method comprising:
utilizing a first clock signal, which is generated by a first wireless communication unit of at least first and second co-located wireless communication units, as a common master clock signal for said at least first and second wireless communication units; and
switching to utilize a second clock signal, which is generated by said second wireless communication unit, as said common master clock signal for said at least first and second wireless communication units, said switching comprising dynamically switching between using said first clock signal as said master clock signal and using said second clock signal as said master clock signal based on at least one criterion selected from the group consisting of a quality criterion, a key performance indicator (KPI) criterion, an accuracy criterion related to an accuracy of said first and second clock signals, an availability criterion related to an availability of said first and second clock signals, and a validity criterion related to a validity of said first and second clock signals.

15. The method of claim 14 comprising selecting, by at least one of said first and second wireless communication units, which of said first and second clock signals is to be utilized as said common master clock signal.

16. The method of claim 14 comprising receiving said first and second clock signals, selecting a selected clock signal from said first and second clock signals, and providing the selected clock signal to said first and second wireless communication units.

17. A product including a non-transitory storage medium having stored thereon instructions that, when executed by a machine, result in:
- utilizing a first clock signal, which is generated by a first wireless communication unit of at least first and second co-located wireless communication units, as a common master clock signal for said at least first and second wireless communication units; and
- switching to utilize a second clock signal, which is generated by said second wireless communication unit, as said common master clock signal for said at least first and second wireless communication units, said switching comprising dynamically switching between using said first clock signal as said master clock signal and using said second clock signal as said master clock signal based on at least one criterion selected from the group consisting of a quality criterion, a key performance indicator (KPI) criterion, an accuracy criterion related to an accuracy of said first and second clock signals, an availability criterion related to an availability of said first and second clock signals, and a validity criterion related to a validity of said first and second clock signals.

18. The product of claim 17, wherein said instructions result in selecting, by at least one of said first and second wireless communication units, which of said first and second clock signals is to be utilized as said common master clock signal.

19. The product of claim 17, wherein said instructions result in receiving said first and second clock signals, selecting a selected clock signal from said first and second clock signals, and providing the selected clock signal to said first and second wireless communication units.

* * * * *

UNITED STATES PATENT AND TRADEMARK OFFICE
CERTIFICATE OF CORRECTION

PATENT NO. : 8,781,047 B2  
APPLICATION NO. : 13/535464  
DATED : July 15, 2014  
INVENTOR(S) : Gil Zukerman et al.

Page 1 of 1

It is certified that error appears in the above-identified patent and that said Letters Patent is hereby corrected as shown below:

On the Title page, in item (74), in column 2, in "Attorney", line 1, delete "Shichur" and insert -- Shichrur --, therefor.

On the Title page, in item (56), in column 2, under "Other Publications", line 12, delete "Specfication," and insert -- Specification, --, therefor.

In the Claims:

In column 15, line 9, in claim 1, after "a" delete "the".

In column 15, line 45, in claim 6, delete "signals" and insert -- signal --, therefor.

In column 16, line 21, in claim 10, delete "form" and insert -- from --, therefor.

In column 16, line 37, in claim 13, delete "sais" and insert -- said --, therefor.

Signed and Sealed this  
Twenty-fifth Day of November, 2014

Michelle K. Lee  
*Deputy Director of the United States Patent and Trademark Office*